US009550968B2

(12) United States Patent
Mitchell et al.

(10) Patent No.: US 9,550,968 B2
(45) Date of Patent: Jan. 24, 2017

(54) WINE PUMP-OVER DEVICE (71) Applicants: Alexander Mitchell, Saint Helena, CA (US); Evan Schneider, Saint Helena, CA (US)

(72) Inventors: Alexander Mitchell, Saint Helena, CA (US); Evan Schneider, Saint Helena, CA (US)

( * ) Notice: Subject to any disclaimer, the term of this patent is extended or adjusted under 35 U.S.C. 154(b) by 215 days.

(21) Appl. No.: 14/478,269

(22) Filed: Sep. 5, 2014

(65) Prior Publication Data

US 2015/0079255 A1 Mar. 19, 2015

Related U.S. Application Data (60) Provisional application No. 61/878,597, filed on Sep. 16, 2013.

(51) Int. Cl.
*C12G 1/032* (2006.01)
*B05B 3/04* (2006.01)

(52) U.S. Cl.
CPC .......... *C12G 1/0216* (2013.01); *B05B 3/0463* (2013.01); *B05B 3/0486* (2013.01); *Y10T 137/85954* (2015.04)

(58) Field of Classification Search
CPC ... C12G 1/0216; B05B 3/0463; B05B 3/0486; Y10T 137/86954
See application file for complete search history.

(56) References Cited

U.S. PATENT DOCUMENTS

| 2,489,952 | A | * | 11/1949 | Boudreaux | ............ B05B 1/265 169/37 |
| 3,478,669 | A | * | 11/1969 | Lanes | ................... C12G 1/0216 99/276 |
| 3,532,273 | A | * | 10/1970 | Buckingham | ........... A01J 7/025 239/222.17 |
| 3,871,272 | A | * | 3/1975 | Melandri | ............. C12G 1/0216 366/137 |

(Continued)

FOREIGN PATENT DOCUMENTS

| EP | 1026233 | * | 8/2000 |
| JP | 8-308552 | * | 11/1996 |
| JP | 2003001224 | * | 1/2003 |

*Primary Examiner* — Anthony Weier
(74) *Attorney, Agent, or Firm* — AKC Patents, LLC; Aliki K. Collins (57) ABSTRACT

A device for distributing wine uniformly over a wine cap includes a T-joint member, an impeller and a shaft. The T-joint member has a top opening, a bottom opening, a side opening, a through-opening extending from the top opening to the bottom opening and a side-through-opening extending from the side opening to the through-opening. The impeller includes a one-piece conical shaped body that has a circular base, a cylindrical center, a conical-shaped outer surface, a central-through-opening extending through the cylindrical center, and a plurality of curved blades extending from the top of the cylindrical center along the inclined outer surface. The T-joint member is configured to allow wine to be pumped into the through-opening through the side opening and to exit through the bottom opening and then to flow onto the impeller. The impeller is configured to allow the wine to flow uniformly around and down the conical-shaped outer surface of the impeller and through the impeller.

18 Claims, 9 Drawing Sheets

(56) References Cited

U.S. PATENT DOCUMENTS

| | | | |
|---|---|---|---|
| 3,910,173 A * | 10/1975 | Zepponi | A23N 1/00 222/460 |
| 5,972,661 A * | 10/1999 | Kubera | B01F 3/04609 261/123 |
| 6,279,457 B1 * | 8/2001 | Francia | C12G 1/0216 99/277 |
| 6,631,732 B1 | 10/2003 | Kostel et al. | |
| 6,715,404 B2 | 4/2004 | Pratt | |
| 6,805,885 B2 | 10/2004 | Francia | |
| 6,945,158 B1 | 9/2005 | Virtue | |
| 7,353,750 B2 | 4/2008 | Francia | |
| 2011/0318823 A1 | 12/2011 | Crosato | |

* cited by examiner

WINE PUMP-OVER DEVICE

CROSS REFERENCE TO RELATED CO-PENDING APPLICATIONS

This application claims the benefit of U.S. provisional application Ser. No. 61878597 filed Sep. 16, 2013 and entitled "WINE PUMP-OVER DEVICE", the contents of which are expressly incorporated herein by reference.

FIELD OF THE INVENTION

The present invention relates to a wine pump-over device used in the process of making wine and in particular to a wine pump-over device used for distributing wine over the wine cap.

BACKGROUND OF THE INVENTION

Red wine is produced by first crushing red and black grapes and then fermenting the crushed grapes including their skins, seeds, grape juice and pulp (also called must).

Usually, yeast is added to the must to start the fermentation process. Fermentation may also occur naturally. During fermentation, the yeast converts the sugars in the grape juice into ethanol and carbon dioxide. The rising carbon dioxide pushes the grape skins to the top and forms a "cap" or "head" of grape skins on the surface of the fermenting red wine. The cap includes naturally occurring substances that are useful in the fermentation process and the overall quality and taste of the wine. Therefore, the free-run wine is pumped and sprinkled over the cap in order to extract and mix the naturally occurring useful chemicals with the free-run wine in the bottom of the fermentation tank.

Several devices have been used to facilitate the pumping and sprinkling of the free-run wine over the cap. Homogeneous distribution of the free-run wine over the cap is critical to the quality and taste of the wine. Also critical are the unobstructed flow of the free-run wine through the wine-pump over and sprinkling device, the droplet size of the wine exiting the sprinkling device and the ease of cleaning of the device.

SUMMARY OF THE INVENTION

The present invention relates to a wine pump-over device used in the process of making wine and in particular to a wine pump-over device used in distributing wine over the wine cap. The wine pump-over device of this invention provides uniform and homogeneous distribution of the free-run wine over the cap, unobstructed flow of the free-run wine through the device and ease of cleaning of the device.

In general, in one aspect, the invention features a device for distributing wine uniformly over a wine cap including a T-joint member, an impeller and a shaft. The T-joint member has a top opening, a bottom opening, a side opening, a through-opening extending from the top opening to the bottom opening and a side-through-opening extending from the side opening to the through-opening. The impeller includes a one-piece conical shaped body that has a circular base, a cylindrical center, a conical-shaped outer surface, a central-through-opening extending through the cylindrical center, and a plurality of curved blades extending from the top of the cylindrical center along the inclined outer surface. The shaft extends through the through-opening of the T-joint member and through the central-through-opening of the impeller. The T-joint member is configured to allow wine to be pumped into the through-opening through the side opening and to exit through the bottom opening and then to flow onto the impeller. The impeller is configured to allow the wine to flow uniformly around and down the conical-shaped outer surface of the impeller and through the impeller.

Implementations of this aspect of the invention include one or more of the following. The curved blades are configured to be twisted around the cylindrical center and have different slopes and/or different shapes. The impeller further includes two twisted through-slots that allow the wine to pass through the impeller and wet the wine cap underneath the impeller. The top of the cylindrical center has a conical shape. The one-piece conical shaped body of the impeller is made of plastic, bronze, stainless steel, ceramic, metals, alloys or composites. The device further includes a cover configured to cover the top opening of the T-joint member. The top end of the shaft is attached to the center of the cover. The impeller is configured to rotate around the shaft. The device further includes a ball bearing configured to reduce rotational friction during the rotation of the impeller. The ball bearing is made of plastic, bronze, stainless steel, ceramic, metals, alloys or composites. The device further includes a bushing configured to be inserted into the central-through-opening and to prevent swaying of the impeller. The bushing is made of plastic, bronze, stainless steel, ceramic, metals, alloys or composites. The distance between the top of the impeller and the bottom of the T-joint member is configured to be adjustable. The device further includes a clamp ring configured to secure the position of the impeller relative to the shaft and thereby to adjust the distance between the top of the impeller and the bottom of the T-joint member. The device further includes a flow conditioner configured to connect to the bottom of the T-joint member and to surround the shaft. The flow conditioner has a cylindrical body having an axial through-opening and ridges formed in an inner surface of the cylindrical body.

In general, in another aspect, the invention features a fermentation system including a fermentation tank and a pump-over device. The fermentation tank contains a liquid to be fermented and a liquid cap and the pump-over device is configured to distribute the liquid to be fermented uniformly over the liquid cap. The pump-over device includes a T-joint member, an impeller and a shaft. The T-joint member has a top opening, a bottom opening, a side opening, a through-opening extending from the top opening to the bottom opening and a side-through-opening extending from the side opening to the through-opening. The impeller has a one-piece conical shaped body, and the one-piece conical shaped body includes a circular base, a cylindrical center, a conical-shaped outer surface, a central-through-opening extending through the cylindrical center, and a plurality of curved blades extending from the top of the cylindrical center along the inclined outer surface. The shaft extends through the through-opening and through the central-through-opening. The T-joint member is configured to allow the liquid to be fermented to be pumped into the through-opening through the side opening and to exit through the bottom opening and then to flow onto the impeller. The impeller is configured to allow the liquid to be fermented to flow uniformly around and down the conical-shaped outer surface of the impeller and through the impeller. The fermentation system further includes a pump and pipes configured to connect the fermentation tank to the pump and the pump-over device.

In general, in another aspect, the invention features a method for distributing wine uniformly over a wine cap including the following. First, providing a T-joint member comprising a top opening, a bottom opening, a side opening, a through-opening extending from the top opening to the bottom opening and a side-through-opening extending from the side opening to the through-opening. Next, providing an impeller comprising a one-piece conical shaped body. The one-piece conical shaped body comprises a circular base, a cylindrical center, a conical-shaped outer surface, a central-through-opening extending through the cylindrical center, and a plurality of curved blades extending from a top of the cylindrical center along the inclined outer surface.

Next, providing a shaft extending through the through-opening and through the central-through-opening. Next, pumping the wine into the through-opening of the T-joint member through the side opening and allowing the wine to exit through the bottom opening and to flow onto the impeller. The impeller is configured to allow the wine to flow uniformly around and down the conical-shaped outer surface of the impeller and through the impeller. The curved blades are configured to be twisted around the cylindrical center and have different slopes.

The details of one or more embodiments of the invention are set forth in the accompanying drawings and description below. Other features, objects and advantages of the invention will be apparent from the following description of the preferred embodiments, the drawings and from the claims.

DETAILED DESCRIPTION OF THE INVENTION

The present invention provides a wine pump-over device used in the process of making wine. The wine pump-over device is used for distributing wine over the wine cap. The wine pump-over device of this invention provides uniform and homogeneous distribution of the free-run wine over the cap, unobstructed flow of the free-run wine through the device and ease of cleaning of the device.

Figure 1:
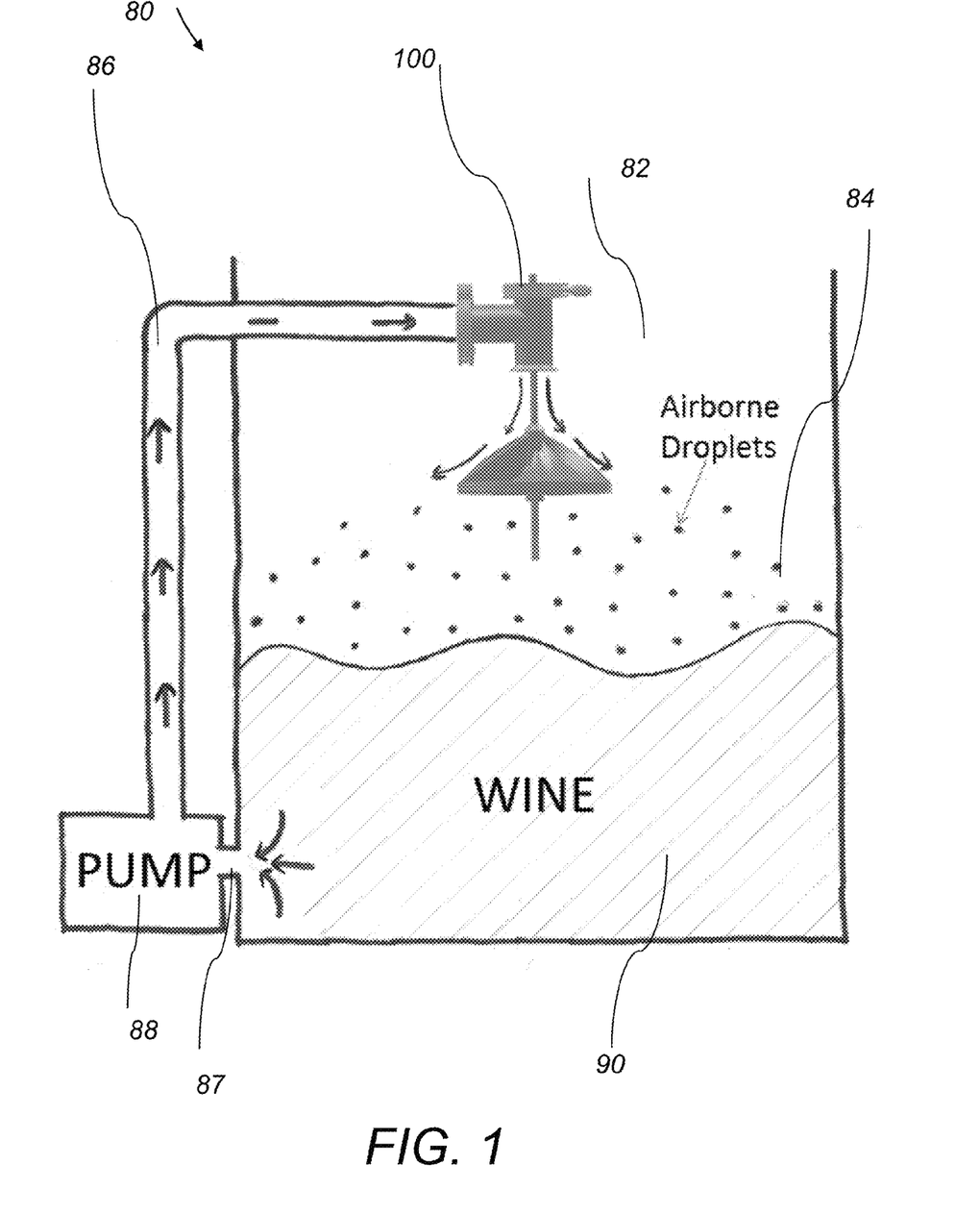
FIG. 1 depicts a fermentation tank with the wine pump-over device of this invention.
Figure 2:
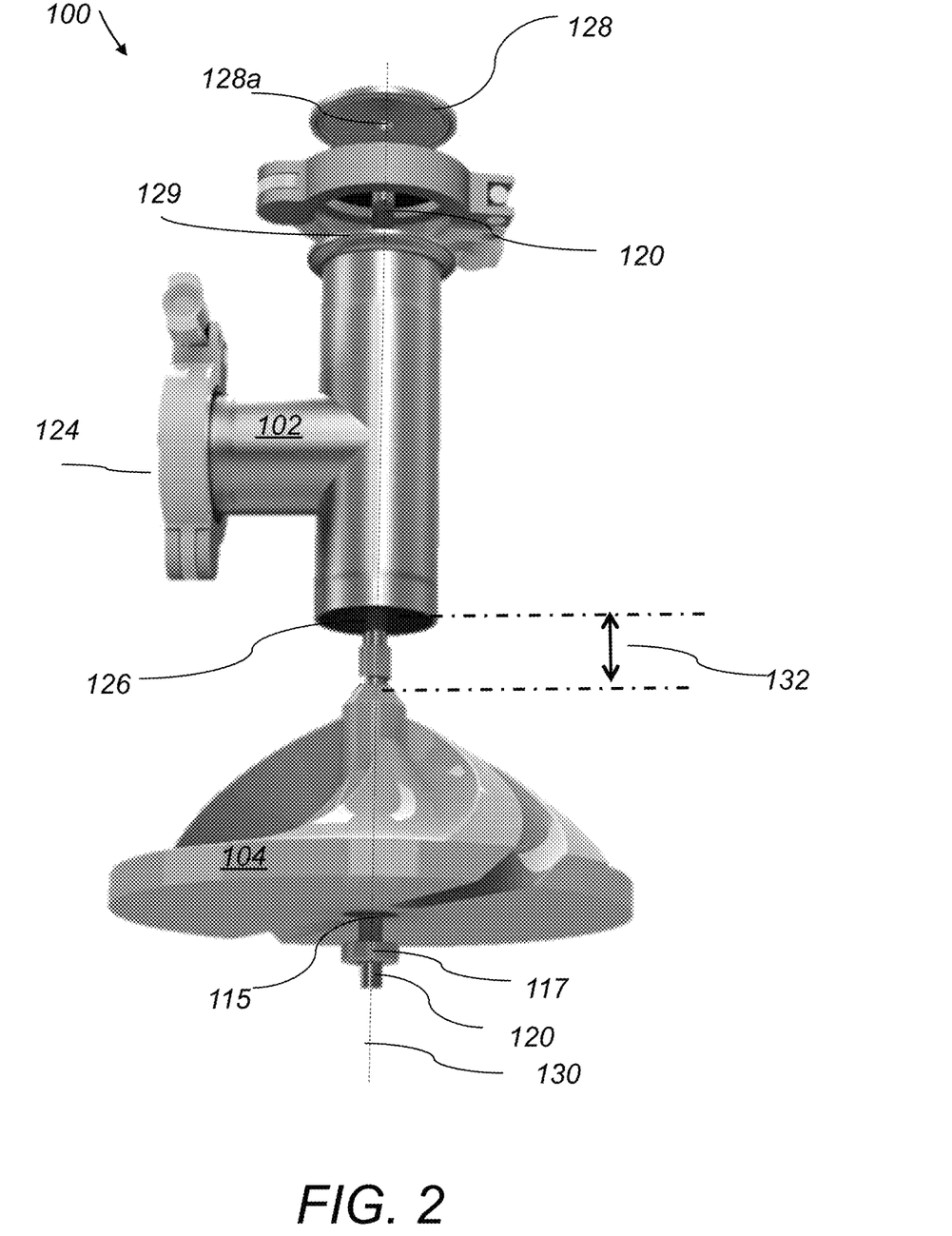
FIG. 2 is a perspective view of the wine pump-over device of FIG. 1.
Figure 3:
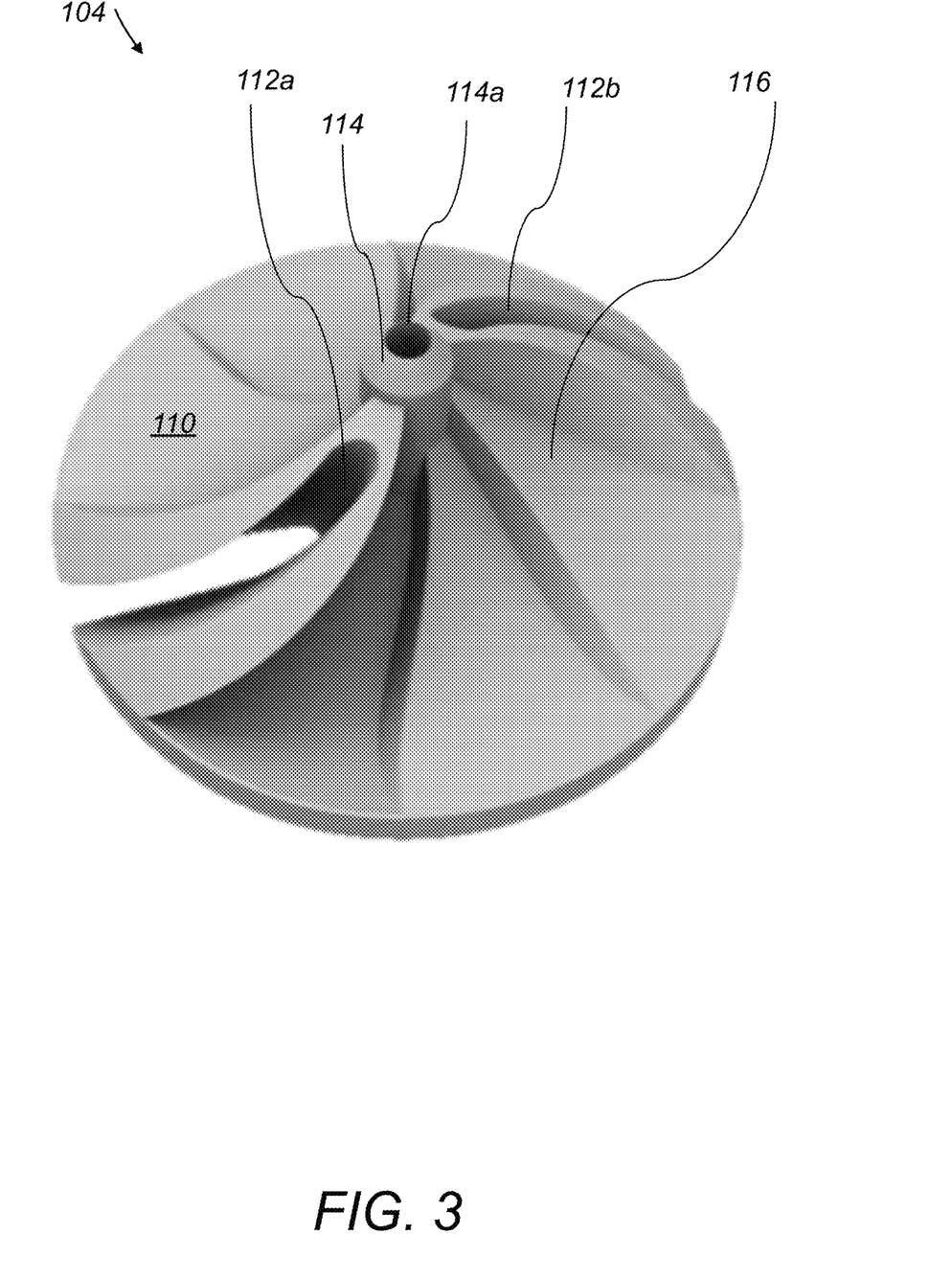
FIG. 3 is a perspective view of the impeller of the wine pump-over device of FIG. 2.
Figure 4:
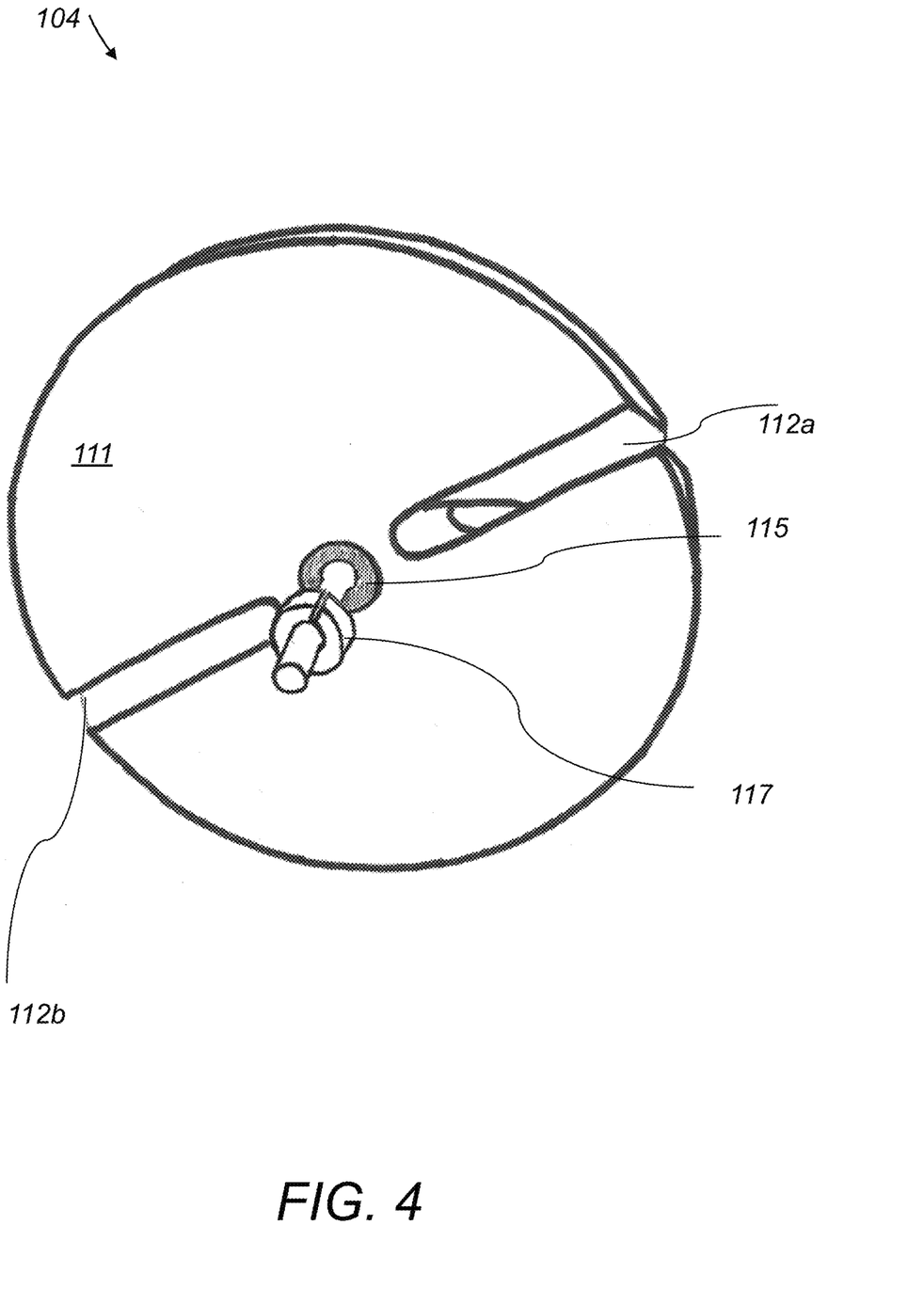
FIG. 4 is a bottom view of the wine pump-over device of FIG. 2.
Figure 5:
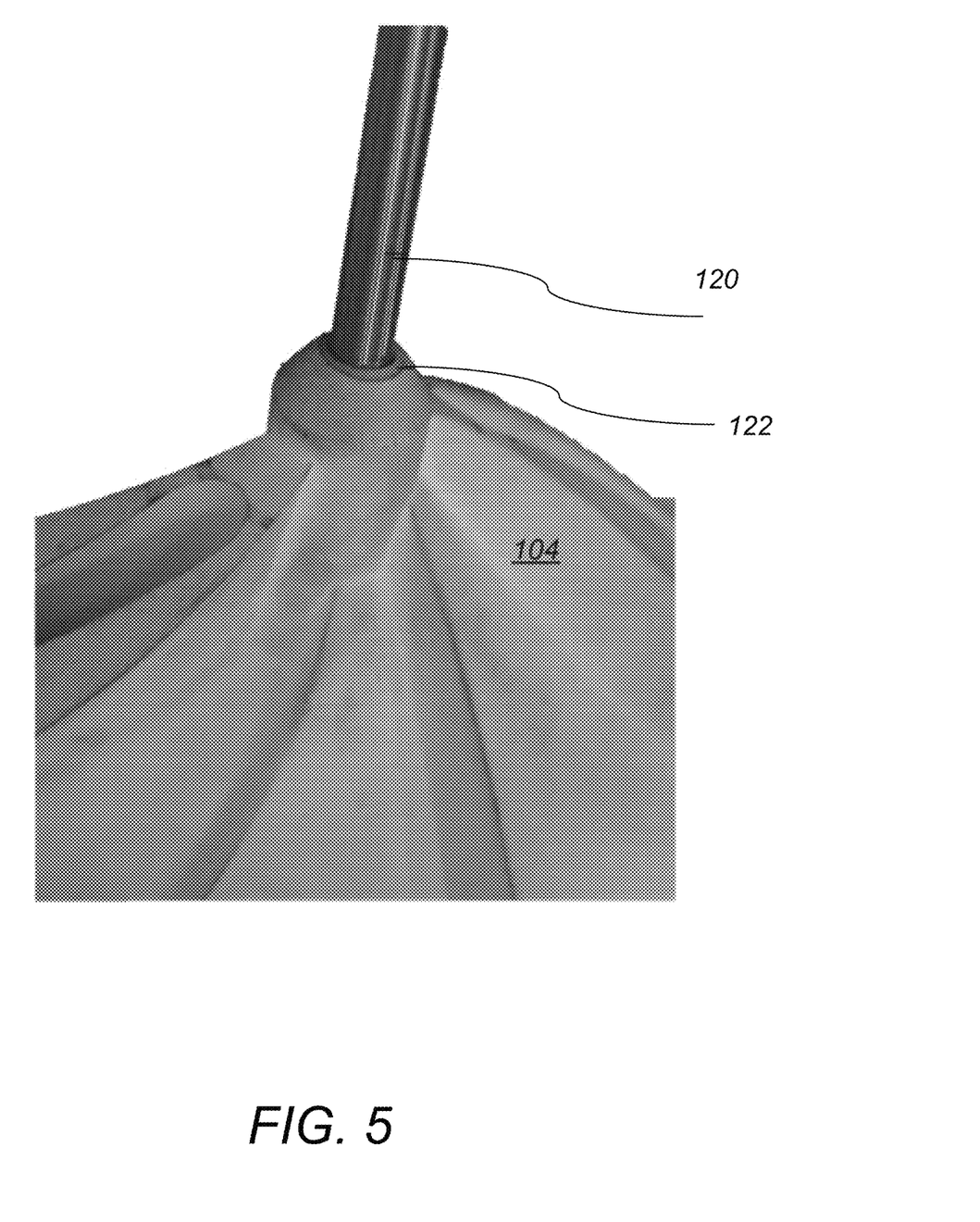
FIG. 5 is a detailed view of the connection between the shaft and the impeller in the wine pump-over device of FIG. 2.
Figure 6:
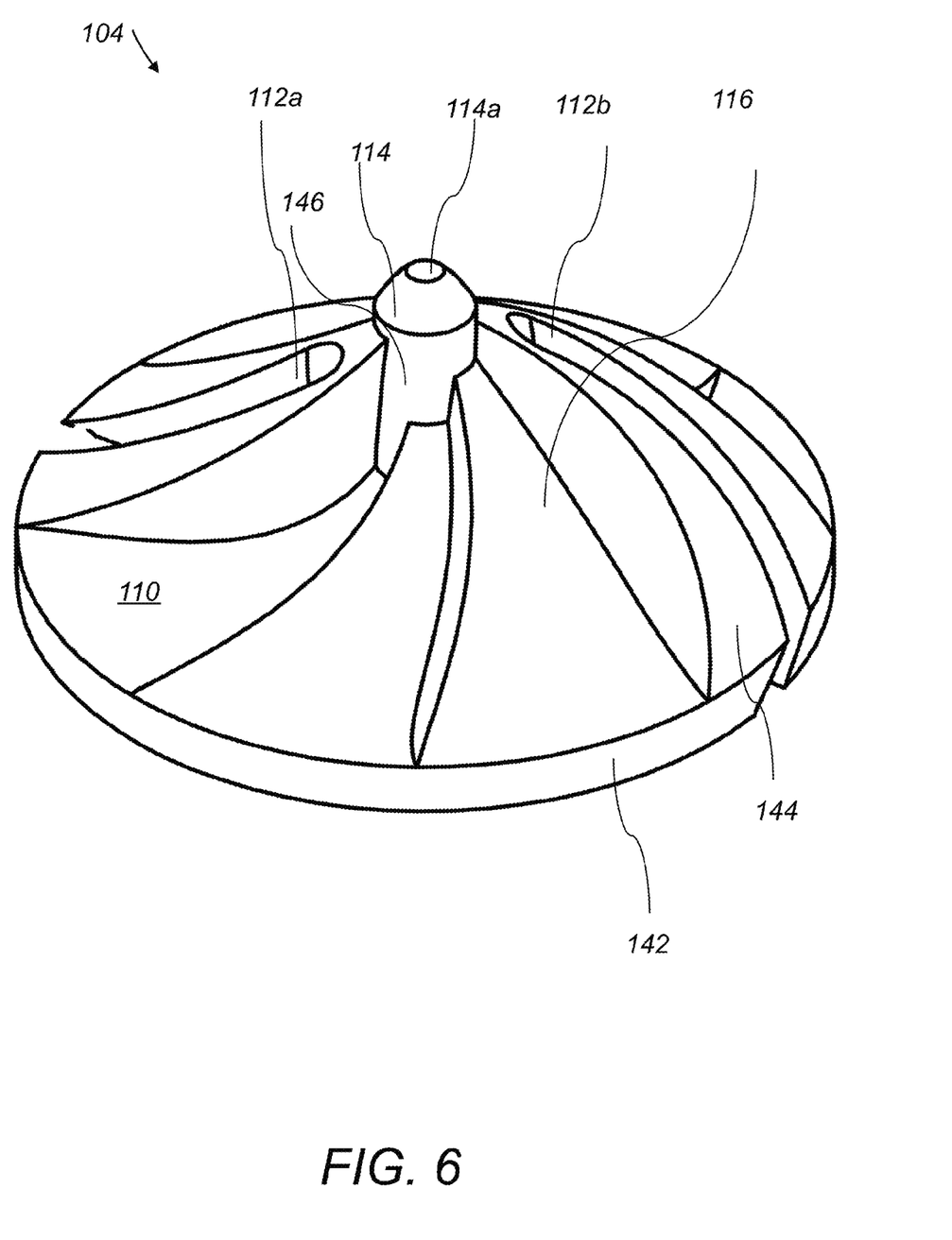
FIG. 6 is a top perspective view of the impeller of the wine pump-over device of FIG. 2.
Figure 7A:
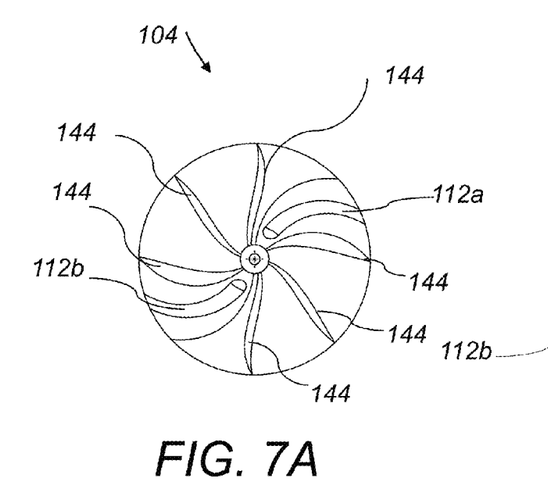
FIG. 7A is a top view of the impeller of FIG. 6.
Figure 7B:
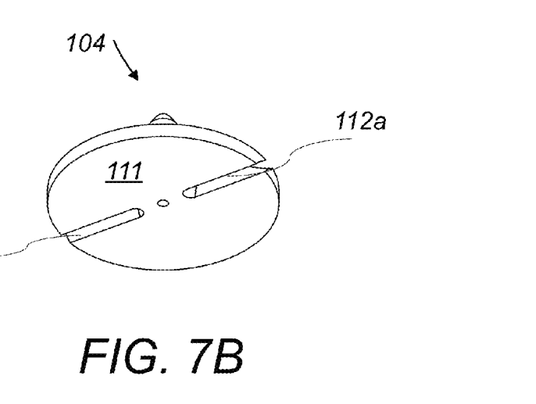
FIG. 7B is a bottom view of the impeller of FIG. 6.
Figure 7C:
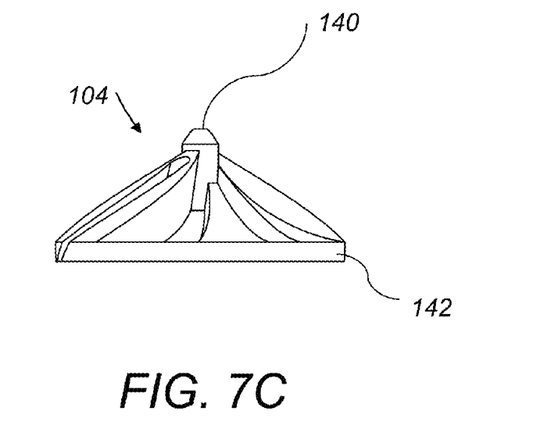
FIG. 7C and FIG. 7D are side views of the impeller of FIG. 6.
Figure 7D:
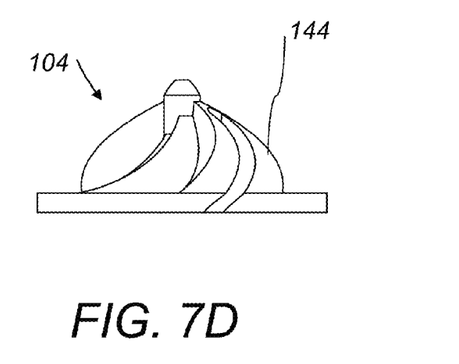

Referring to FIG. 1, a fermentation system 80 according to this invention includes a fermentation tank 82, a wine pump-over device 100, a pump 88 and pipes 86 and 87 connecting the pump to the pump-over device 100 and the pump to the tank 82, respectively. The fermentation tank 100 contains the free-run wine 90 in the bottom and the cap 84 in the top surface of the free-run wine. Pump 88 pumps free-run wine 90 from the bottom of the tank 82 to the wine pump-over device 100 and the wine pump-over device 100 distributes the wine over and through the cap uniformly and efficiently.

Referring to FIG. 2-FIG. 5, the wine pump-over device 100 of this invention includes a T-joint member 102, an impeller 104, a shaft 120, a bushing 122, ball bearing 115 and a clamp ring 117. T-joint member 102 has an open side end 124, a bottom opening 126 and a top opening 129. Wine 90 is pumped through the open side end 124 of the T-joint member 102 and is pushed through the bottom opening 126 over the impeller 104. Top opening 129 is covered with a cap 128. Shaft 120 has an end welded to the center 128a of cap 128 and then extends through the T-joint member from the cap 128, passes through the bottom opening 126 and through an opening 114a of the impeller 104. Shaft 120 extends along axis 130 and supports the impeller 104. The impeller 104 is configured to rotate passively around the shaft 120 under the influence of the flowing fluids. A bushing 122 prevents the impeller 104 from swaying and keeps the device 100 rigid. Ball bearing 115 supports the impeller 104 while reducing the rotational friction of the impeller 104 about the shaft 120. Clamp ring 117 secures the position of the impeller 104 relative to the shaft 120 and allows for the adjustment of the distance 132 between the top of the impeller 104 and the bottom of the T-joint member 102. Adjusting distance 132 affects the coverage area of the impeller and the size of the wine droplets. In one example, all of the components of the wine pump-over device 100 including the ball bearing 115 are made of food-grade material such as stainless steel. Bushing 122 is made of plastic, bronze, ceramic, or other metallic materials or alloys. In one example, shaft 120 is a rod having a diameter of ⅜ inch and is made of stainless steel.

Referring to FIG. 3, FIG. 4, FIG. 6 and FIG. 7A-FIG. 7D, impeller 104 has a one-piece continuous conical shaped body 110 that includes a circular base 142 and a cylindrical center 146 that extends from top 140 to base 142. Cylindrical center 146 has a central opening 114a and a conical top 114. Shaft 120 passes through the central opening 114a that extends from the top 140 to the base 142. Impeller body 110 also includes 6 curved blades 144 that extend from the top 140 to the base 142 along the inclined outer surface 116. In other examples impeller 110 includes fewer or more than six blades 144. Curved blades 144 have different slopes and shapes, and are twisted around the cylindrical center 146. The curved blades 144 provide gradual and dynamic slope changes to the outer surface 116 and help prevent "bruising" or "misting" of the wine. Impeller 110 also includes two twisted through-slots 112a, 112b that allow the wine to pass through the slots and wet the cap underneath the impeller 110. Impeller 104 is made of plastic, bronze, ceramic, or other metallic materials or alloys. The one-piece continuous construction of the impeller allows it to be cleaned easily, contributes to unobstructed flow of the wine and prevents clogging of the device.

Figure 8:
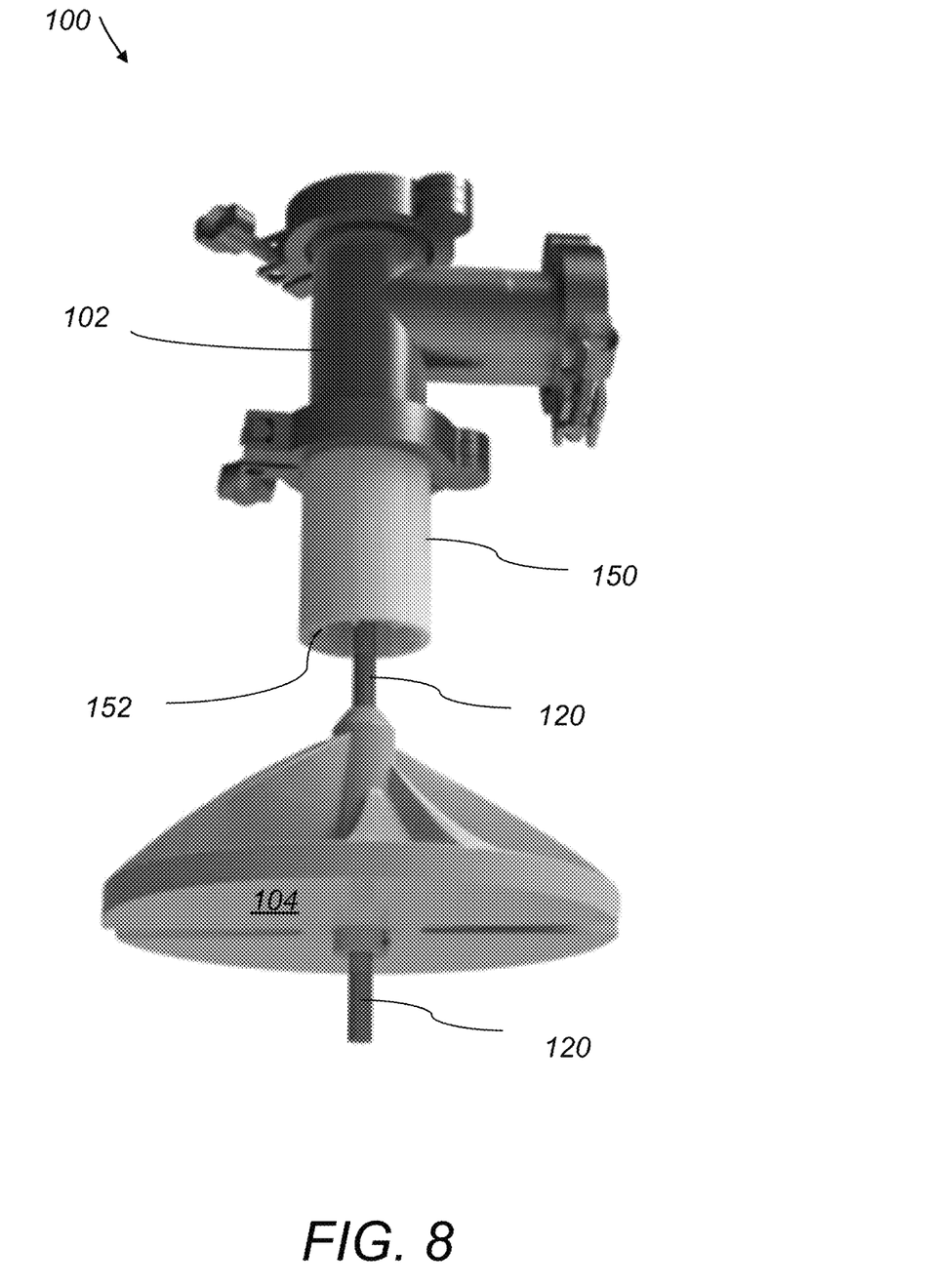
FIG. 8 is a perspective view of the wine pump-over device of FIG. 1 including a flow conditioner.
Figure 9:
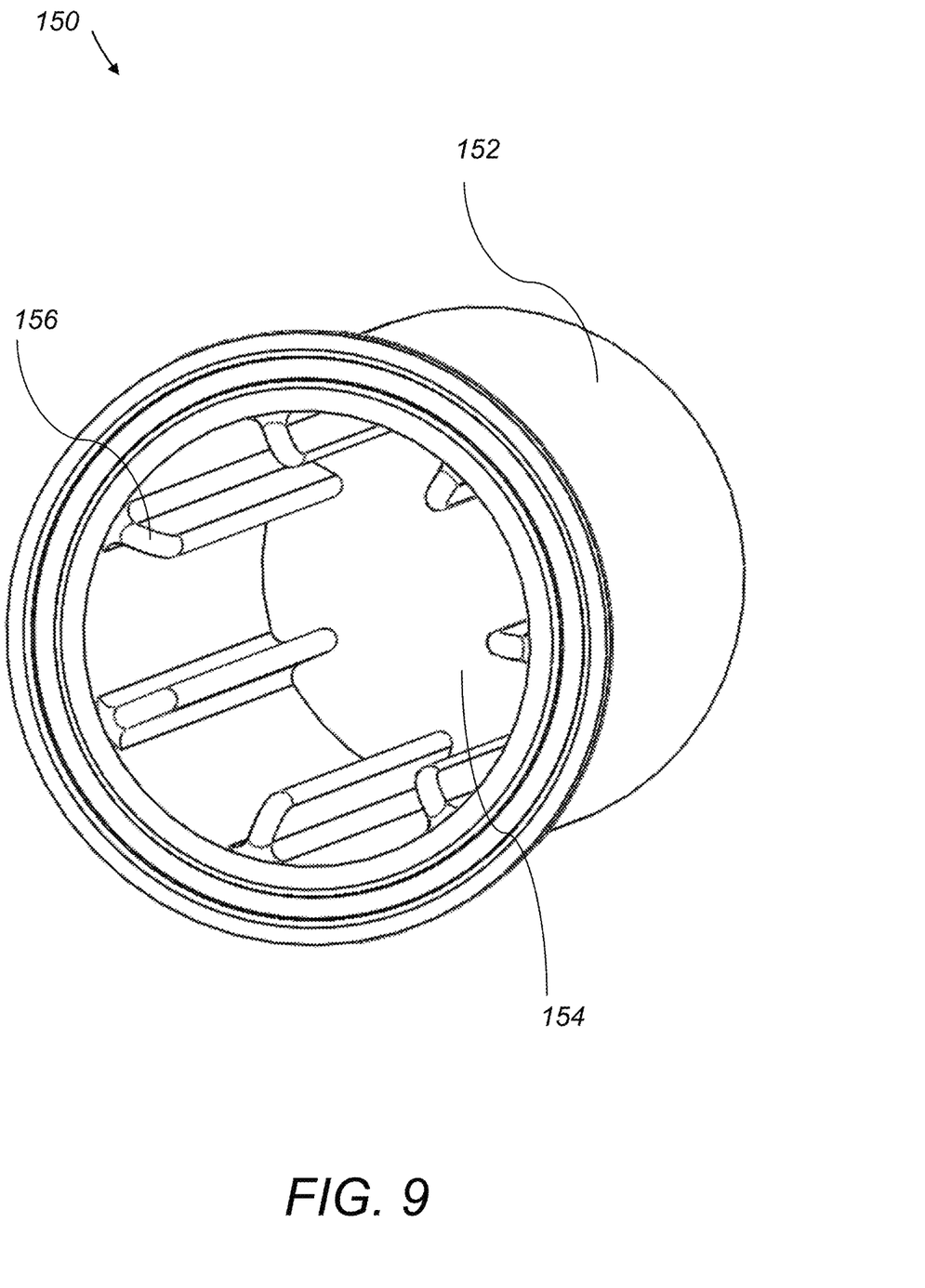
FIG. 9 is a perspective view of the flow conditioner of FIG. 8.

Referring to FIG. 8 and FIG. 9, the wine pump-over device 100 also includes a flow conditioner 150. Flow conditioner 150 includes a cylindrical body 152 having an axial through opening 154 and ridges 156 formed in the inner surface 152a of the cylindrical bod. Flow conditioner 150 has an end that connects to the bottom of the T-joint member 102 and surrounds the shaft 120. Flow conditioner 150 aids in making the flow of the wine more uniform as it exits from the T-joint.

Several embodiments of the present invention have been described. Nevertheless, it will be understood that various modifications may be made without departing from the spirit and scope of the invention. Accordingly, other embodiments are within the scope of the following claims.

What is claimed is:

1. A device for distributing wine uniformly over a wine cap comprising:
   a T-joint member comprising a top opening, a bottom opening, a side opening, a through-opening extending from said top opening to said bottom opening and a side-through-opening extending from said side opening to said through-opening;
   an impeller comprising a one-piece conical shaped body, wherein said one-piece conical shaped body comprises a circular base, a cylindrical center, a conical-shaped outer surface, a central-through-opening extending through said cylindrical center, and a plurality of curved blades extending from a top of the cylindrical center along the inclined outer surface;
   a shaft extending through said through-opening of the T-joint member and through said central-through-opening of the impeller; and
   wherein the T-joint member is configured to allow wine to be pumped into the through-opening through the side opening and to exit through the bottom opening and to flow onto the impeller and wherein the impeller is configured to allow the wine to flow uniformly around and down the conical-shaped outer surface of the impeller and through the impeller.

2. The device of claim 1, wherein the curved blades are configured to be twisted around the cylindrical center and comprise different slopes.

3. The device of claim 2, wherein the curved blades further comprise different shapes.

4. The device of claim 1, wherein the impeller further comprises two twisted through-slots that allow the wine to pass through the impeller and wet the wine cap underneath the impeller.

5. The device of claim 1, wherein the top of the cylindrical center comprises a conical shape.

6. The device of claim 1, wherein the one-piece conical shaped body of the impeller comprises one of plastic, bronze, stainless steel, ceramic, metals, alloys or composites.

7. The device of claim 1, further comprising a cover configured to cover the top opening of the T-joint member and wherein a top end of the shaft is attached to a center of the cover.

8. The device of claim 1, wherein the impeller is configured to rotate around the shaft.

9. The device of claim 8, further comprising a ball bearing configured to reduce rotational friction during the rotation of the impeller.

10. The device of claim 9, wherein the ball bearing comprises one of plastic, bronze, stainless steel, ceramic, metals, alloys or composites.

11. The device of claim 1, further comprising a bushing configured to be inserted into the central-through-opening and to prevent swaying of the impeller.

12. The device of claim 11, wherein the bushing comprises one of plastic, bronze, stainless steel, ceramic, metals, alloys or composites.

13. The device of claim 1, wherein a distance between the top of the impeller and the bottom of the T-joint member is configured to be adjustable.

14. The device of claim 13, further comprising a clamp ring configured to secure the position of the impeller relative to the shaft and thereby to adjust the distance between the top of the impeller and the bottom of the T-joint member.

15. The device of claim 1, further comprising a flow conditioner configured to connect to the bottom of the T-joint member and to surround the shaft.

16. The device of claim 15 wherein the flow conditioner comprises a cylindrical body having an axial through-opening and ridges formed in an inner surface of the cylindrical body.

17. A fermentation system comprising:
   a fermentation tank comprising a liquid to be fermented and a liquid cap;
   a pump-over device configured to distribute the liquid to be fermented uniformly over the liquid cap;
   wherein the pump-over device comprises a T-joint member comprising a top opening, a bottom opening, a side opening, a through-opening extending from said top opening to said bottom opening and a side-through-opening extending from said side opening to said through-opening; an impeller comprising a one-piece conical shaped body, wherein said one-piece conical shaped body comprises a circular base, a cylindrical center, a conical-shaped outer surface, a central-through-opening extending through said cylindrical center, and a plurality of curved blades extending from a top of the cylindrical center along the inclined outer surface; a shaft extending through said through-opening and through said central-through-opening; and wherein the T-joint member is configured to allow the liquid to be fermented to be pumped into the through-opening through the side opening and to exit through the bottom opening and to flow onto the impeller and wherein the impeller is configured to allow the liquid to be fermented to flow uniformly around and down the conical-shaped outer surface of the impeller and through the impeller.

18. The fermentation system of claim 17, further comprising a pump and pipes configured to connect the fermentation tank to the pump and the pump-over device.

* * * * *